United States Patent [19]
Velsko

[11] Patent Number: 5,841,570
[45] Date of Patent: Nov. 24, 1998

[54] FREQUENCY AGILE OPTICAL PARAMETRIC OSCILLATOR

[75] Inventor: Stephan P. Velsko, Livermore, Calif.

[73] Assignee: The Regents of the University of California, Oakland, Calif.

[21] Appl. No.: 791,340

[22] Filed: Jan. 31, 1997

[51] Int. Cl.$^6$ ...................................................... G02F 1/39
[52] U.S. Cl. ............................................. 359/330; 372/21
[58] Field of Search ................................... 359/326–332; 372/21, 22

[56] References Cited

U.S. PATENT DOCUMENTS

| | | | |
|---|---|---|---|
| 3,629,602 | 12/1971 | Firester | 359/330 |
| 3,922,561 | 11/1975 | Byer et al. | 359/328 |
| 5,033,057 | 7/1991 | Bosenberg et al. | 359/330 X |
| 5,053,641 | 10/1991 | Cheng et al. | 359/330 |
| 5,159,487 | 10/1992 | Gieger et al. | 359/330 |
| 5,634,922 | 6/1997 | Hirano et al. | 606/10 |
| 5,661,595 | 8/1997 | Stamm et al. | 359/330 |
| 5,671,241 | 9/1997 | Stamm et al. | 359/330 X |

OTHER PUBLICATIONS

Ramen Basu and William H. Steier, "Bandwidth and Threshold Calculations for Angle–Tuned Parametric Oscillators," IEEE Journal of Quantum Electronics, vol. QE–8, No. 8, pp. 693–699, Aug. 1972.

Stephen J. Brosnan and Robert L. Byer, "Optical Parametric Oscillator Threshold and Linewidth Studies," IEEE Journal of Quantum Electronics, vol. QE–15, No. 6, pp. 415–431, Jun. 1979.

*Primary Examiner*—John D. Lee
*Attorney, Agent, or Firm*—John P. Wooldridge

[57] ABSTRACT

The frequency agile OPO device converts a fixed wavelength pump laser beam to arbitrary wavelengths within a specified range with pulse to pulse agility, at a rate limited only by the repetition rate of the pump laser. Uses of this invention include Laser radar, LIDAR, active remote sensing of effluents/pollutants, environmental monitoring, antisensor lasers, and spectroscopy.

14 Claims, 6 Drawing Sheets

FREQUENCY AGILE OPTICAL PARAMETRIC OSCILLATOR

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to tunable laser systems, and more specifically, it relates to a rapidly tunable optical parametric oscillator.

2. Description of Related Art

It has long been understood that rapid pulse-to-pulse wavelength tuning (a.k.a. "frequency agility") of laser transmitters is required to increase the usable information rate and decrease the data taking dwell time in remote spectroscopy applications (e.g. DIAL for environmental monitoring). The three basic requirements for the "ideal" frequency agile transmitter are: (i) it must be capable of emitting a different wavelength for each pulse at repetition rates exceeding 10 Hz, (ii) a continuous range of wavelengths within a given range must be available, and (iii) the wavelengths must be emittable in any arbitrary sequence. In the prior art, the $CO_2$ laser, which can be switched rapidly among its available lines in the 9 to 10 $\mu$m region, is capable of fulfilling requirements (i) and (iii) but not (ii). Similarly, the optical parametric oscillator (OPO) is known to be capable of continuous tuning to arbitrary wavelengths within a specified range, but only by changing the crystal angle or temperature, processes which are too slow to allow arbitrary sequences of wavelengths to be produced on a pulse-to-pulse basis. The frequency agile OPO described herein fulfills all three requirements cited above: it has the ability to tune to arbitrary wavelengths within a given continuous tuning range, on a pulse-to-pulse basis at repetition rates determined only by the pump laser, such as a Nd:YAG or similar solid state laser.

It is generally recognized that rapid pulse-to-pulse tuning over wide spectral ranges is required to maximize the DIAL information rate and to deconvolute overlapping spectral signatures. When topographic backscatter is utilized, the rate at which independent DIAL returns can be obtained for a single wavelength is determined by a "correlation time" $t_c$, whose magnitude depends on platform velocity and atmospheric turbulence and is generally in the millisecond regime. N single-color DIAL returns obtained at a rate faster than $1/t_c$ do not average with $1/\sqrt{N}$ scaling of the precision. To the extent that different wavelengths give statistically independent returns, the rate at which the concentration of a single species can be determined to a given precision can be increased to $M/t_c$ by devoting M separate wavelengths to M distinct absorption features of that species. In addition, to obtain separate concentration estimates of m species with overlapping spectral features, sets of >m+1 lines are desirable.

$CO_2$ DIAL systems with pulse-to-pulse rapid tuning capabilities have existed for many years. However, the spectral format of the output of such systems has been restricted in practice to the discrete molecular lines characteristic of low pressure $CO_2$ lasers. The selection of useful lines is further restricted by the requirement that they lie close to the minima of water vapor or atmospheric $CO_2$ absorption bands, so that measurements are minimally affected by the random changes in the column integrated background absorption spectrum which occurs naturally on the ≈minute time scale as atmospheric inhomogeneities propagate across the LIDAR path. The irregular placement of atmospheric transmission bands clearly makes the capability of random access to a continuous range of wavelengths highly desirable.

Solid state lasers offer several potential approaches to rapid tuning with random access to a continuous range of wavelengths. Continuously tunable solid state lasers in the near-IR such as alexandrite or Ti:sapphire are well developed, and can be frequency-shifted into other useful spectral regions such as the mid-IR with optical parametric oscillators (OPOs). Because the OPO adiabatically tunes its output with the tuning of the pump wavelength, a rapid tuning scheme for the pump laser alone is sufficient. A second approach to rapid tuning is to use a fixed frequency pump laser and derive frequency agility from the OPO itself. Electro-optic tuning of certain nonlinear crystals provides a basis for obtaining a few tens of wave numbers of tuning with practical voltages ($\approx 1$ cm$^{-1}$ per kV/cm of field strength is a typical characteristic value for common OPO crystals). Angle tuning of the phase matching condition potentially provides larger practical tuning ranges, 10 cm$^{-1}$ /mrad being a typical tuning rate.

SUMMARY OF THE INVENTION

It is an object of the present invention to provide a frequency agile optical parametric oscillator.

An embodiment of the invention consists of a beam deflector, image relay telescope, an input coupling mirror, a nonlinear optical (NLO) crystal and an output coupling mirror. The beam deflector changes the angle of the pump beam about some pivot point. The relay telescope transfers that pivot point, lying in the object plane of the telescope, to an image plane located at center of the nonlinear crystal. Thus, to the lowest order, the irradiance profile of the pump beam at the center of the crystal does not change as the beam angle is changed. The input and output coupling mirrors form the resonator of the optical parametric oscillator. This resonator fixes the direction of the resonated wave with resonated wavelength $\lambda_r$. The idler wave direction and wavelength is determined by the noncollinear phase matching condition appropriate to the pump wavelength, the pump beam angle, the crystal type and orientation, and the value of $\lambda_r$. Rapid tuning is accomplished by rapidly adjusting the beam deflector to change the position of the image plane located within the nonlinear crystal, and synchronizing the deflection with the laser pulses. The deflector may be, e.g., a galvanometric moving mirror, an acousto-optic beam deflector, or an electro-optic beam deflector.

Unlike OPO's which are tuned by changes in crystal angle or temperature, the frequency agile OPO is capable of changing its output wavelength as fast as the repetition rate of the pump laser, when a suitable deflector is used. With an acousto-optic beam deflector, the frequency can be reset at rates as fast as 100 kHz. Unlike the rapidly tunable $CO_2$ laser, the frequency agile OPO is capable of accessing a continuous range of wavelengths within a specified region and is not restricted to particular, fixed set of lines. The frequency agile OPO is capable of generating its output wavelengths in any arbitrary sequence, reprogrammable by control of the beam deflector.

Several variations and extensions may be contained in particular embodiments of this invention: (i) a beam reducing or expanding telescope may be used to magnify or demagnify the pump deflection angle, (ii) folded or ring resonator designs and stable or unstable resonators may be used for the OPO cavity, (iii) a fixed or tunable etalon may be inserted within the OPO resonator to line narrow the output, (iv) the OPO may be injection seeded with tunable or frequency multiplexed seed sources, (v) lithium niobate, $AgGaS_2$, $AgGaSe_2$, KTP, KTA, $ZnGeP_2$, CdSe, KDP, BBO, LBO, CLBO or other suitable NLO crystals may be used within the frequency agile OPO device and (vi) the frequency agile OPO may be pumped with Nd:YAG, Nd:YLF, Tm:YAG, Ho:YAG, Er:YAG, KrF, or other suitable lasers.

One approach to rapidly-tunable parametric oscillators utilizes pump angle tuning and non-collinear phase matching. An embodiment of the present invention provides 500 $cm^{-1}$ tuning (1480–1600 nm) of a lithium niobate OPO by changing the angle of incidence of the pump beam over a range of ±30 mrad. Small changes in the output angle of the resonated wave, the output beam shape, and output energy are caused by changes in the overlap between pump beam and resonator mode volume. Changes in cavity architecture and pump beam size do not have a strong effect on these characteristics. The invention produces changes in the spectral width of the OPO output as the pump angle is changed. The addition of fast mechanical or acousto-optic deflectors enables the invention to produce pulse to pulse tuning rates of 10 kHz or higher.

DETAILED DESCRIPTION OF THE INVENTION

Figure 1:
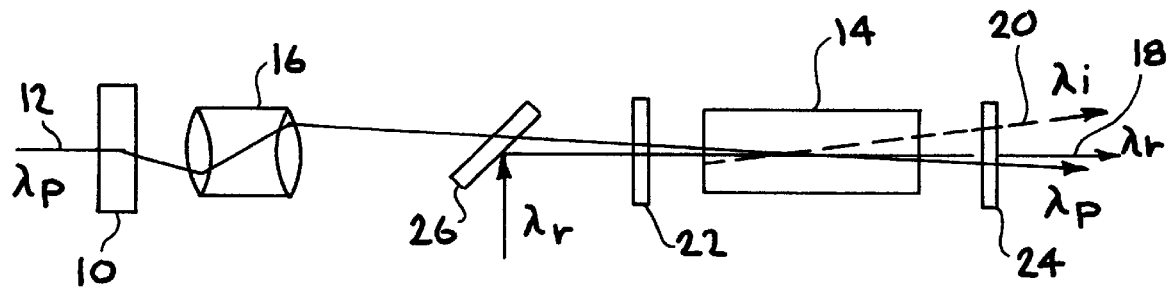
FIG. 1 shows an embodiment of the rapidly tuning OPO using pump angle deflection.

The present invention uses pump angle tuning as a way to realize a rapidly tunable OPO. This choice is based on system efficiency considerations, and the need for a tuning range of ≈200 $cm^{-1}$ to allow deconvolution of broadband absorbers in the mid-IR, and other spectral regions. FIG. 1 shows the conceptual approach to rapid tuning of a singly resonant OPO by using a fast beam deflector 10 to change the angle of the pump beam 12 within a fixed crystal/resonator device 14. The telescope 16 is designed to relay an object plane at the pivot point of the beam deflector 10 to an image plane at the OPO midplane, thus ensuring (to lowest order) that the pump irradiance profile does not change position in the OPO as the pump angle is changed. Since the resonator axis exerts a strong anchoring effect on the direction of the resonated wave 18 ($\lambda_r$) (the "signal" wave), phase matched regenerative parametric amplification occurs in a noncollinear mode with the idler wave 20 ($\lambda_i$) angle adjusting itself adiabatically as the pump angle changes. A resonator comprising an input coupling mirror 22 and output coupling mirror 24 is formed around nonlinear crystal 14. Simple plane-wave noncollinear phase matching calculations imply that changes of a few tens of milliradians of a 1 $\mu$m pump beam 12 can lead to several hundred wave numbers of frequency tuning in the mid-infrared in a lithium niobate OPO. A dichroic mirror 26 can be used to inject a seed pulse into the nonlinear crystal 14.

Figure 2:
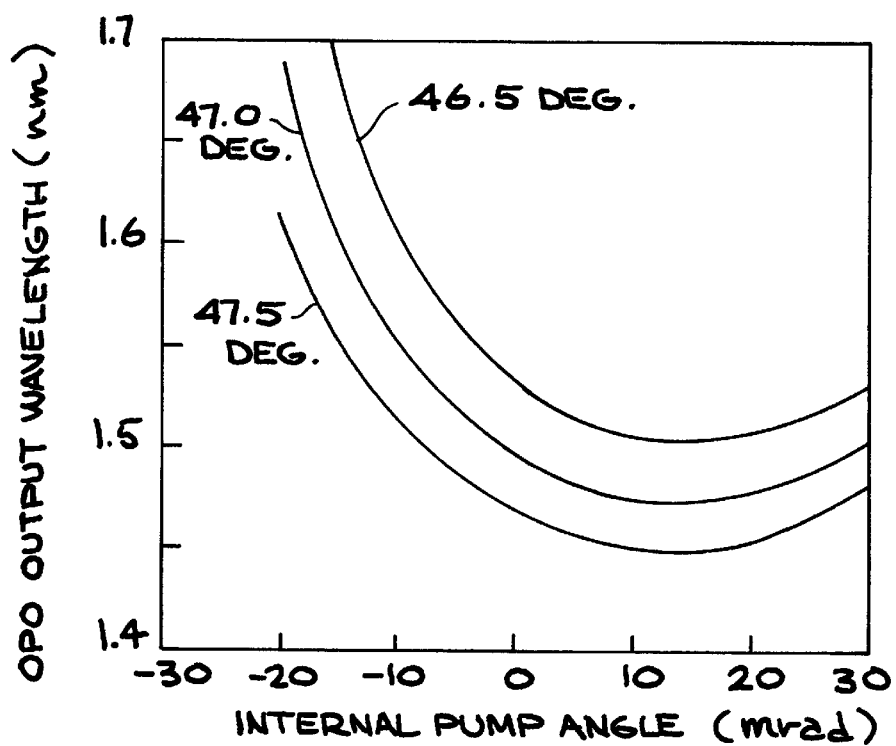
FIG. 2 shows calculated noncollinear tuning curves for lithium niobate at three crystal orientations relative to the resonator axis.

FIG. 2 shows calculated tuning curves for a lithium niobate OPO pumped at 1.064 $\mu$m, with the resonated wave in the 1.5 $\mu$m region, at three different crystal orientations with respect to the resonator axis. The angle of the pump beam is measured relative to the resonator axis, which defines the collinear phase matching condition. The angle the idler beam makes with respect to the resonator axis is not displayed, but is approximately twice the pump angle in these calculations.

Figure 3:
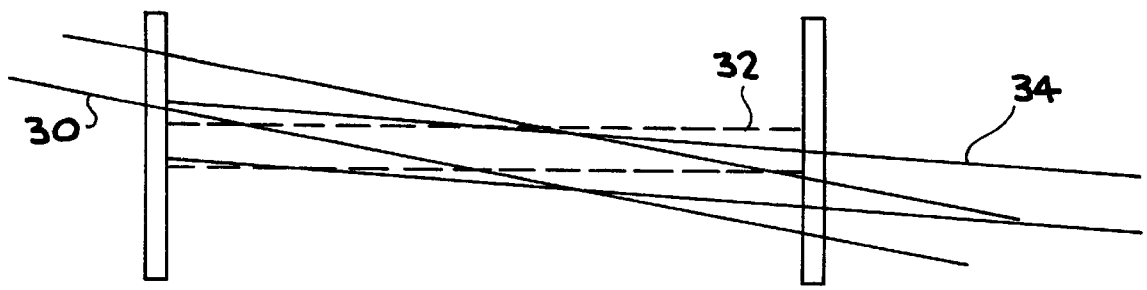
FIG. 3 shows non-ideal behavior of a pump angle tuned OPO.

While the "zero order" theory represented by FIG. 1 implies that the resonator axis should lock the direction of the resonated wave, it is clear that for a finite-sized pump beam tilted away from the resonator axis, and a finite pump duration (i.e., limited number of cavity round trips for the resonated wave) the actual gain to loss ratio for the resonated wave will probably be highest for some "compromise" spatial "mode" which is not perfectly aligned with the resonator axis, as illustrated in FIG. 3 which shows pump beam 30, resonator mode volume 32 and resonated wave output 34. Thus, some tilting of the resonated wave as the pump angle is changed may be anticipated. In addition, one might also expect reduced conversion efficiency, distortions in the transverse spatial profile, and changes in the spectral line shape of the output beams as the change in pump angle modifies the spatial overlap between pump and resonated wave. These secondary effects of pump beam steering clearly cannot be treated by a simple planewave approximation to the OPO dynamics.

A series of experiments demonstrated the basic validity of the pump angle tuning scheme for rapid OPO tuning, and assessed the magnitude of the beam steering, beam distortion, and spectral broadening effects. A study was made of an Nd:YAG pumped OPO which resonates the ≈1.5 $\mu$m beam and generates a "free" idler wave at ≈3.6 $\mu$m because resonator optics, beam profiling diagnostics, and a spectrometer for this wavelength range were readily available. (From a practical point of view, of course, resonating the ≈3.6 $\mu$m wave would be a better choice when this wavelength is the desired output, since much smaller, if any, beam steering corrections are necessary for the resonated wave as the OPO is tuned.)

The experimental arrangement was essentially that shown in FIG. 1, with the beam deflector replaced by a simple mirror mounted on a precision rotation stage. The relay telescope from the deflecting mirror to the mid plane of the OPO was formed by two 20-cm focal-length lenses in the confocal configuration to give a 1:1 magnification. The image relay property of this telescope was not perfect, and lateral motion of the transverse profile of the pump amounting to ≈10% of the beam diameter was observed at the extreme angular positions of the mirror (±40 mrad). A CCD camera was placed ≈40 cm behind the OPO high reflector and was centered on the pump beam after it passed through the OPO to provide a fiducial to check that the beam returned to the same angle when the rotation stage was reset to its reference position.

The pump laser provided an injection-seeded SLM pulse with a duration of ≈10 ns, at a repetition rate of 10 Hz. After beam conditioning optics, the pump beam had a quasi-gaussian transverse profile with 50% of the energy contained in a spot ≈2.5 mm in diameter (at the OPO mid plane.) Collimation of the pump beam was checked only by visually observing the apparent pump beam diameter on an IR phosphor card over the distances of about ±1 m about the OPO position. Pulse energies of approximately 30 mJ were used in all the experiments described here, unless otherwise stated. The OPO contained a 5-cm-long lithium niobate crystal nominally cut at 47° to the z axis. The faces were AR coated and reflected ≈1% at 1.06 and 1.5 $\mu$m. Reflectivity data at 3.6 $\mu$m was not available. Various cavity mirrors were used, as will be described below.

The beam profile of the resonated wave as well as its movement with pump angle was determined with a pyroelectric array camera. This camera was placed approximately 40 cm away from the OPO output coupler, and has a 100 $\mu$m/pixel resolution. The beam analyzer automatically displayed the position of the brightest pixel (i.e., most intense spot on the profile) on each shot, and this was used as the measure of how far the signal beam moved as the pump beam angle was changed. While this method is clearly not as precise as, say, finding the beam centroid from the beam profile, its accuracy was considered sufficient for this exploratory study.

A holographic beamsplitter was placed after the output coupler (and before the pyroelectric camera) to deviate ≈1% of the OPO output for spectral analysis. The spectrum of the signal wave output was determined with a 0.75-m monochromator using an InGaAs photodiode as a detector. The resolution of the monochromator was ≈1 $cm^{-1}$ when 100 $\mu$m slits were used, although for broader spectra, the slits were occasionally widened to 250 $\mu$m. A pair of iris diaphragms defined an alignment path to the input slit of the monochromator, and a lens was used to concentrate the beam onto the slit. After each pump angle change, the beam was realigned to the irises so the angle of the beam going into the concentrating lens was approximately the same. Energies at 1.5 $\mu$m were measured with a pyroelectric joulemeter.

Figure 4:
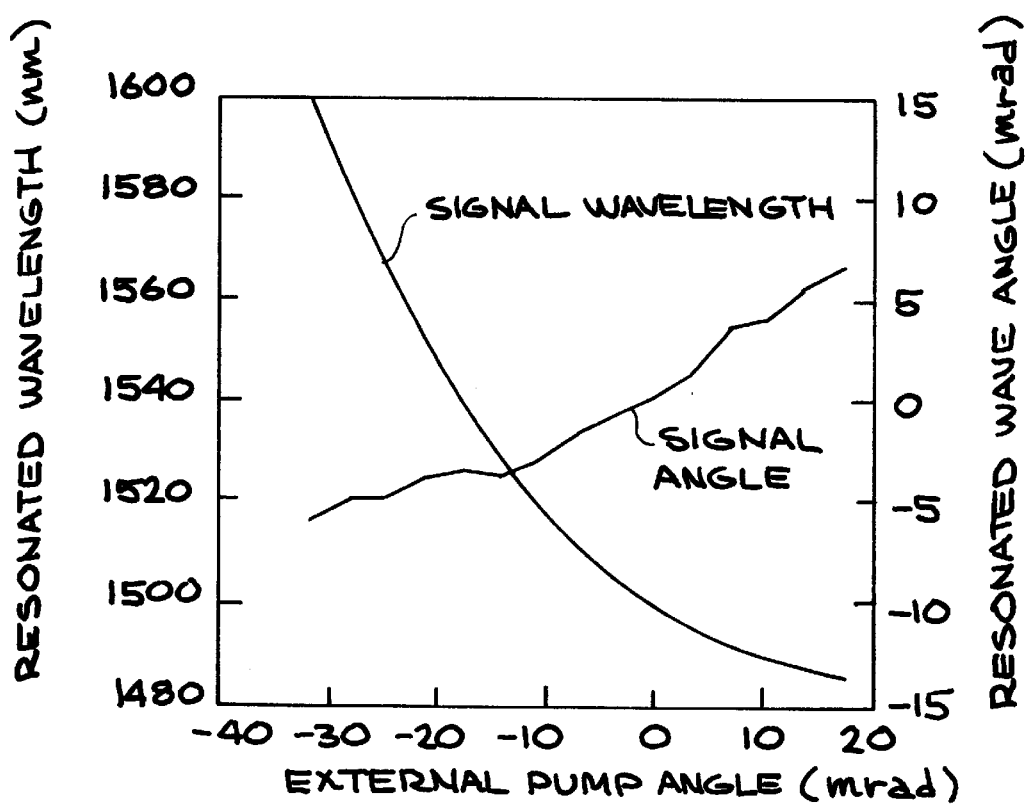
FIG. 4 shows an experimental angle tuning curve for a lithium niobate OPO which is esonant for the 1.5 $\mu$m signal wave.

Most of our measurements were made with an OPO cavity consisting of a flat 100% high reflector and a flat 50% output coupler. In these experiments the lithium niobate crystal was not oriented face normal to the cavity axis, but was tilted so that the collinear OPO wavelength was ≈1.50 $\mu$m. Other orientations of the crystal (i.e., other "starting wavelengths" were not systematically examined, but define a space of operating points which could be explored. FIG. 4 shows the measured wavelength tuning and the deviation angle of the signal wave as the pump beam was scanned by ±30 mrad around its nominal collinear orientation. The data in FIG. 4 indicates that the resonated wave is deviated by about ⅓ of the pump angle deflection. It is also apparent from FIG. 4 that the angular pulling effect may not be strictly linear over the entire pump angle range. However, a linear fit to the angular deflection data in the 0 to −30 mrad region gives a deflection rate of ≈0.2 (mrad signal/mrad pump).

Figure 5:
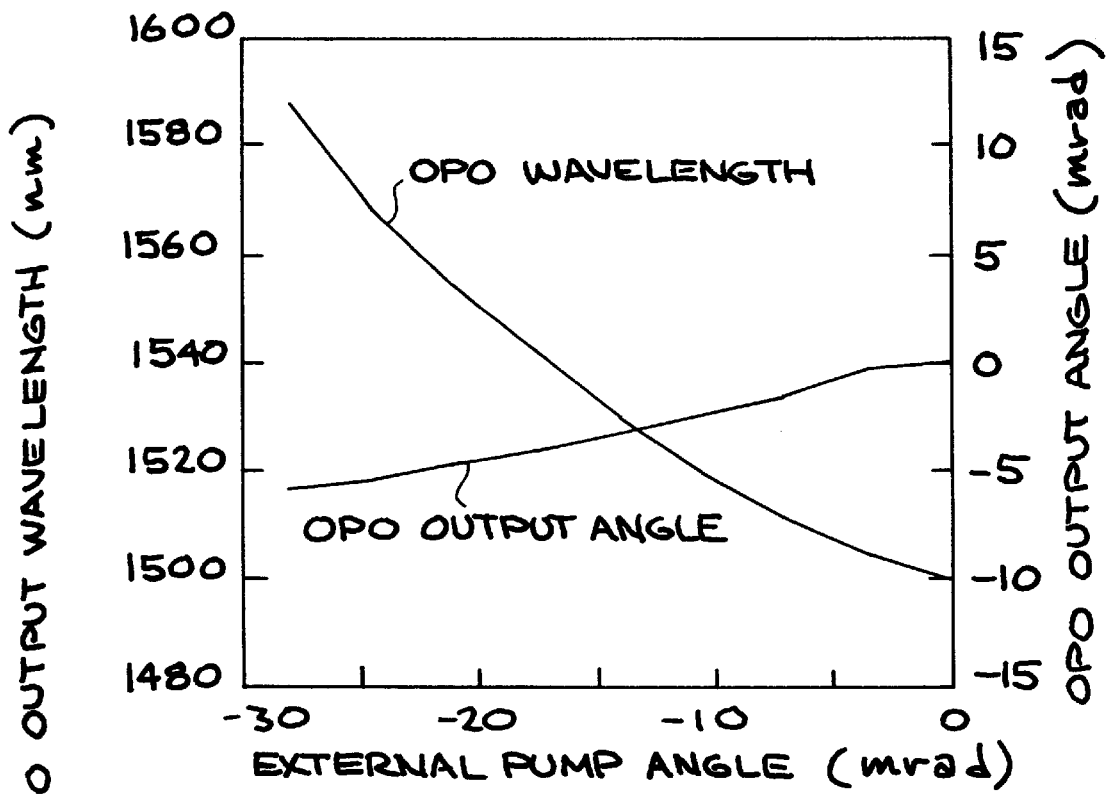
FIG. 5 shows the tuning and output deflection characteristics of the OPO with a stable hemispherical resonator.

It was observed that the signal (resonated) wave was pulled in a direction which makes it more parallel to the pump as the pump angle is changed. This is most probably caused by a beam overlap effect, i.e., a tradeoff between gain and loss which keeps the signal beam within the gain volume as long as possible during the (transient) gain period. Smaller pulling rates might be obtained if the resonated wave is confined to a mode volume which is smaller than the gain volume produced by the pump laser beam. Since previous experiments have shown that a stable hemispherical cavity tends to confine the resonated wave to such a mode (at least at modest pump levels), the OPO tuning experiments were repeated with a 10 m concave high-reflector and flat output coupler instead of the flat-flat cavity. The results are shown in FIG. 5. A linear fit to the angular deviations for this stable cavity gave a deflection rate of 0.22 mrad signal/mrad pump, identical within experimental uncertainty to the flat-flat cavity data. Also examined was the effect of a confocal unstable resonator on the angle pulling effect, and a deflection rate of 0.21 mrad signal/mrad pump was obtained . These results indicate that the magnitude of the pulling effect is not sensitive to small perturbations around the flat-flat resonator.

By the same reasoning, a larger diameter pump beam might be expected to decrease the pulling angle of the resonated wave by making a larger gain volume. To test this idea, the beam conditioning optics were changed to expand the pump beam diameter by a factor of 1.5, and the pump energy was raised to maintain the same average pump irradiance in the stable cavity OPO. The best linear fit to the angular deviation data obtained under these conditions gave a deflection rate of 0.17 mrad signal/mrad pump. This implies that, at least for a gaussian-like pump beam, a rather large change in the gain volume leads (at best) to only a small change in the angle pulling of the resonated wave.

Figure 6:
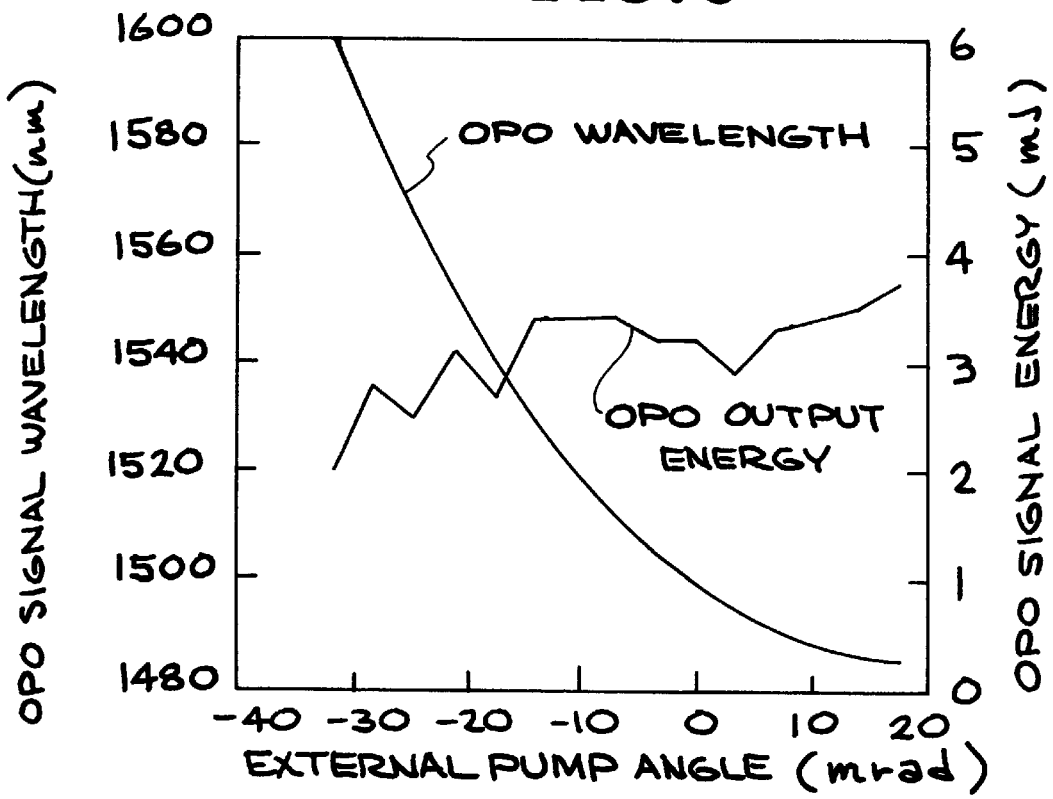
FIG. 6 shows change in output energy over the tuning range for a flat-flatresonator.
Figure 7A:
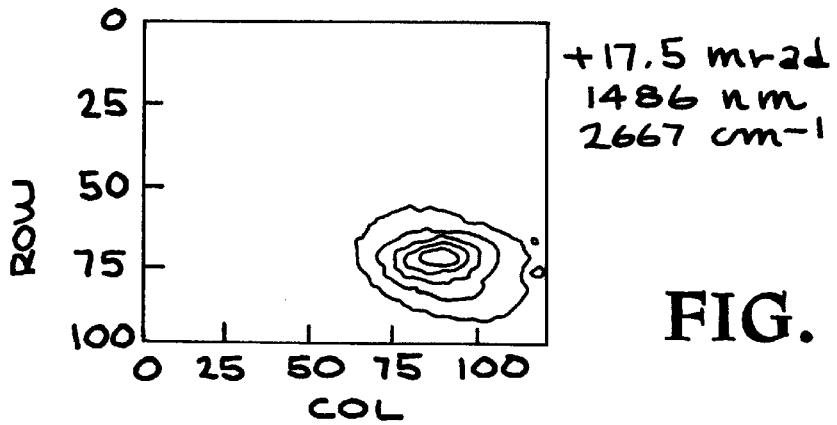
FIGS. 7A–D display the changes in OPO output beam shape observed at four pump orientations.
Figure 7B:
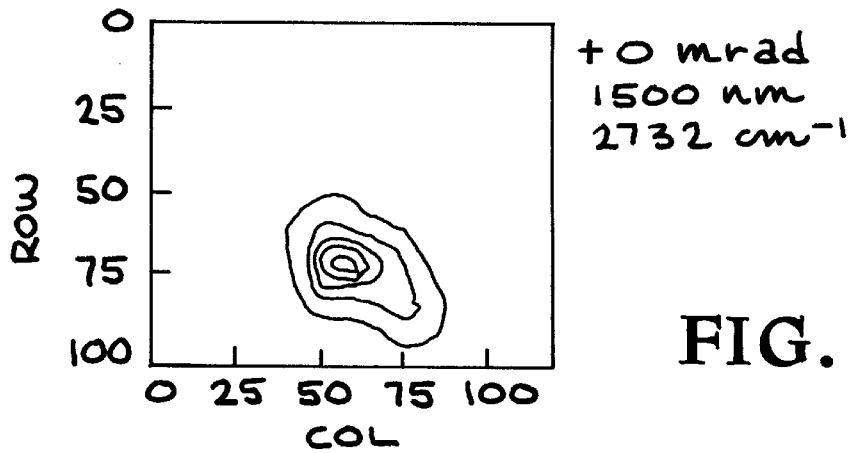
Figure 7C:
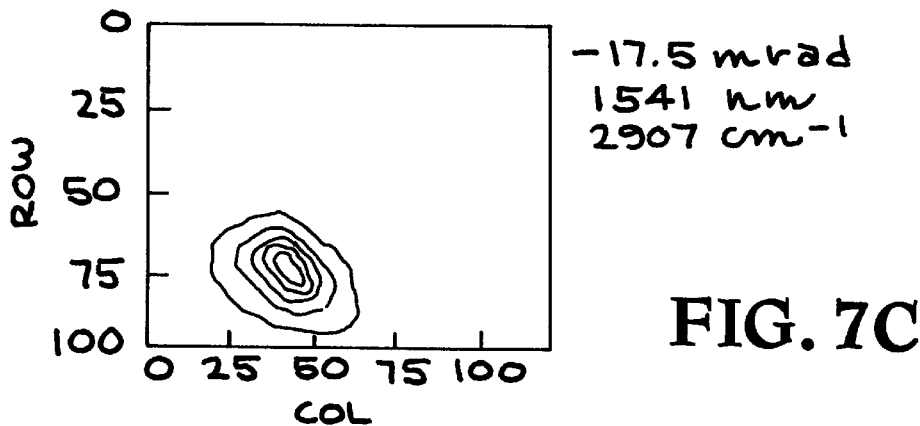
Figure 7D:
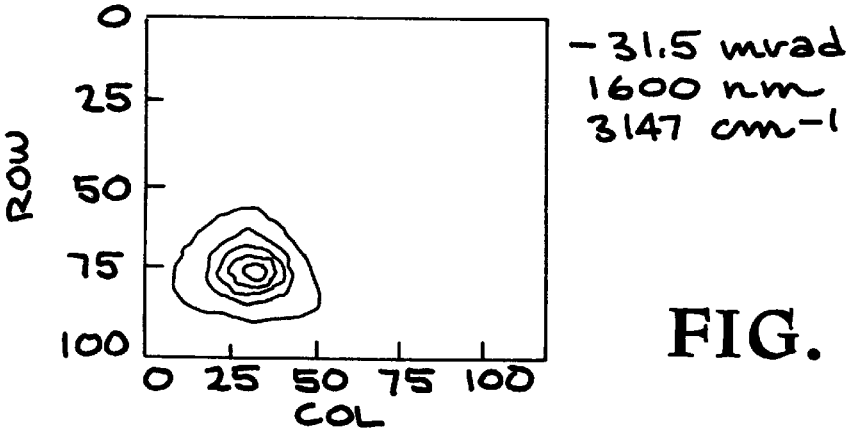

The output energy changes induced by pump angle deflection were modest in all of the resonators tested. FIG. 6 shows the output energy for the flat-flat cavity. The general trend toward higher energies at the short wavelength side is much larger than would be expected on the basis of constant pump depletion efficiency, but is clearly not simply a consequence of smaller overlap between pump and resonated wave since that would presumably produce a more symmetric decrease in output energy about the collinear position. Movement of the pump beam toward or against the walkoff angle might be correlated with the observed energy changes, but no theoretical guidance is available yet. The cause of the fluctuations around the general trend is also not clear, but may be associated with inhomogeneities in the lithium niobate crystal.

FIGS. 7A–D display the changes in OPO output beam shape observed at four pump orientations. As the pump beam angle changes, the transverse profile of the OPO output beam changes shape, but not dramatically. Only at the extreme positive angle position does a noticeable elongation appear. Since the pyroelectric beam profiling camera was located at an "intermediate-field" position, it is not clear if these subtle changes in profile reflect phase or irradiance distribution changes at the plane of the OPO. Clearly, a more definitive study would require the separate monitoring of true near- and far-field profiles to sort this out.

Figure 8:
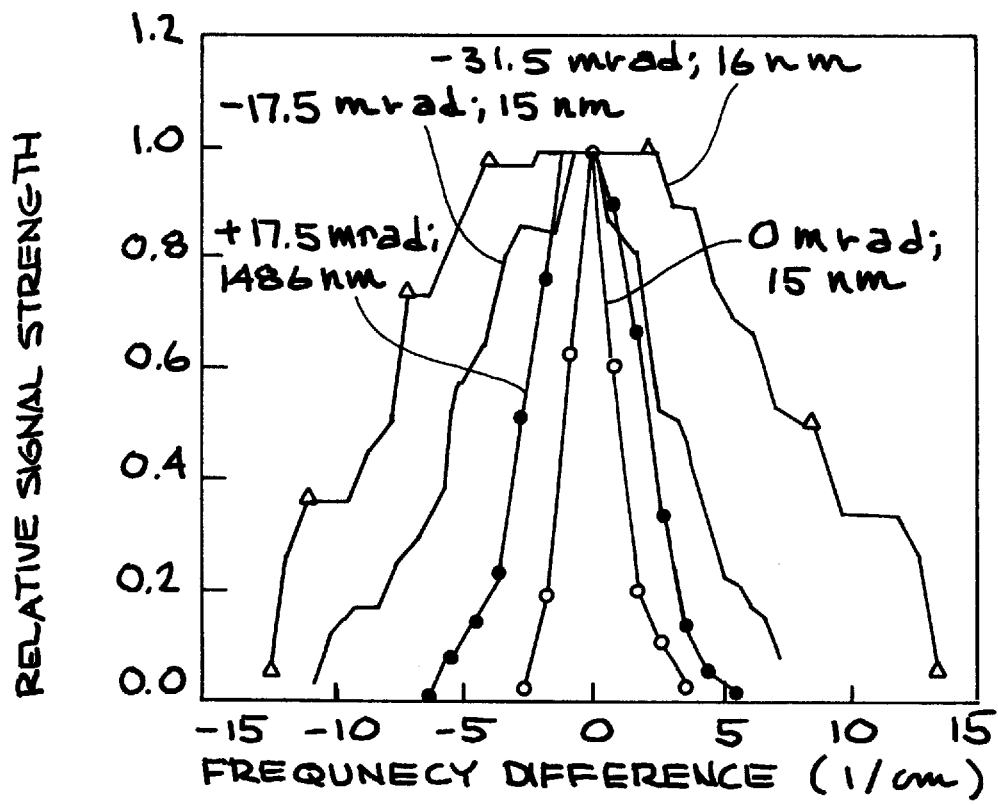
FIG. 8 shows the spectral content of the OPO output as a function of pump angle.

In contrast to the subtle beam shape changes, very pronounced changes in spectral linewidth as a function of pump orientation were observed. FIG. 8 shows the spectrum of the resonated wave output at the same set of pump orientations used to generate the beam profiles of FIG. 7. As the pump angle changes from collinear (1500 nm) to −31.5 mrad (1600 nm), the spectral width changes form approximately 3 $cm^{-1}$ FWHM to more than 15 $cm^{-1}$ FWHM. An increase in spectral linewidth could be expected from the tuning data in FIG. 4 since the value of dλ/dθ is increasing approximately linearly with the pump angle θ in this direction. Thus any wavefront curvature on the pump beam, or any pointing jitter should result in an apparent increase in linewidth. However, FIG. 8 shows that the linewidth also increases as the pump angle is tuned to positive values, where the value of dλ/dθ should be decreasing, according to FIG. 4. As in the case of the angular pulling effects on the resonated wave, a quantitative theory of the accompanying linewidth changes remains to be developed.

This study has also uncovered some significant issues which will require more detailed experimental or theoretical investigation in order to optimize the practical implementation of rapid angle tuning in an OPO:

The degree to which angular deflection of the resonated wave will be reduced by more pronounced deviations from a flat-flat cavity, or by a flatter (less gaussian) pump beam irradiance profile requires careful experimental evaluation. Injection seeding may also help lock the direction of the resonated wave output.

The possible effects of aberrations induced on the pump wavefront by its skew path through the simple relay telescope were not considered. Such aberrations may be an important contributor to the spectral broadening or resonated wave deflection effects.

The spectral broadening effect requires a consistent qualitative explanation, as well as more careful quantitative characterization. The impact of the observed broadening on line-narrowing the OPO output, either with an internal etalon or by injection seeding requires investigation.

The noncollinear tuning ranges associated with other OPO materials such as $KNbO_3$, $AgGaS_2$ and KTA need to be assessed for applications in the 3–11 μm range.

There are several possible methods of fast pump-beam deflection. Acousto-optic (A.O.) beam deflectors can provide several tens of milliradians of deflection with random access times of ≈10 μs, thus providing a basis for deflection (tuning) rates of greater than 10 kHz. Commercial single transducer $TeO_2$ modulators can provide as much as 15 mrad of deflection with efficiencies of 80% or greater. An optimized A.O. deflector for steering a Nd:YAG pump beam into a rapidly tunable OPO would probably consist of a phased array transducer type $TeO_2$ device. An A.O. beam deflector also provides a method of correcting the angular deviations of the OPO output, if necessary.

Galvanometric mirror deflectors can be used to obtain even larger angular changes at random access rates approaching 1 kHz. In addition, the efficiency of these devices is just the mirror reflectivity, and can easily exceed 99%. Clearly, a galvanometric mirror and acousto-optic deflector can be combined, with the mirror providing "coarse" angle changes at a reduced duty factor and the acousto-optic modulator providing "fine" angle tuning at the full repetition rate.

Finally, electro-optic beam steering has the attractive features of very high efficiency and fast switching speeds but, to date, has not been capable of more than a few milliradians of deflection. New electro-optic materials or new device architectures may provide larger deflection angles. It is also possible that electro-optic beam steering could play a role in correcting the small angle changes associated with the resonated wave in the noncollinear OPO.

Several line narrowing methods can be envisioned in conjunction with the rapid tuning scheme proposed here. Injection seeding of the resonated wave requires that the seed laser output be matched to OPO cavity modes. There are two basic architectures which can fulfill this requirement. In one architecture, a finite number of discrete diode lasers are multiplexed and injected simultaneously into the OPO cavity. The OPO cavity length is locked to resonance with one "master" seed laser, and the remaining seed lasers are then locked to resonances of the OPO cavity. The "master" seed laser wavelength could be set, for example, to hit a particular narrowband absorption line, while others could be set near the centers of particular atmospheric transmission bands. A more general architecture would result from constructing a frequency-agile multiwave-seed (MWS) source which covers the entire tuning range accessed by the resonated wave in the OPO. The fundamental mode spacing of the multiwave seeder must match the OPO longitudinal mode spacing (typically in the ≈1 GHz range) or some multiple or submultiple of it. The desired seed wavelength would then be switched out of the MWS and injected into the OPO in synchrony with the pump angle deflection.

Passive line narrowing techniques are also compatible with the rapid tuning scheme outlined above. A fixed etalon allows rapid tuning over a set of narrowed lines whose spacing is related to the free spectral range of the etalon, and whose spectral width is determined by the etalon finesse. To make the tuning behavior truly continuous, it would be necessary to scan the etalon (perhaps electro-optically) to place the pass-band in the center of the OPO gain bandwidth as the pump angle is changed.

The experimental results described above verify that substantial tuning ranges can be accessed by changing the angle of a fixed wavelength pump beam within a fixed resonator OPO. Only a few tens of milliradians of angle change are necessary for generating a few hundred wave numbers of tuning in a lithium niobate OPO, in qualitative agreement with plane-wave calculations. This provides a basis for rapidly tunable parametric oscillator where the pump beam is deflected by an electro-mechanical, acousto-optic or electro-optic device.

Accurate DIAL determination of the individual concentrations of a mixture of compounds in a plume or cloud generally requires the transmitter to emit a number of wavelengths across the region spanned by the (usually overlapping) absorption spectra of the components. To effectively average over speckle noise, and to minimize the effects of atmospheric or plume drifts, the ideal format for the emitted wavelengths is a repetitive sequence of lines, rather than a step by step scan. Until recently, the only field demonstrated DIAL transmitter source with this kind of wavelength agility has been the grating tuned $CO_2$ laser. An embodiment of the frequency agile parametric oscillator of the present invention, operating in the 3.3–3.6 μm region, has been incorporated into a DIAL transceiver used to make multicomponent concentration measurements at a 7 km standoff range on plumes containing mixtures of typical hydrocarbons.

In one embodiment, the OPO crystal was a standard 47° cut, 5 cm long piece lithium niobate pumped by the Nd:YAG laser fundamental. The pump beam was coupled into the OPO using an internal 45° dichroic mirror (99% R@1.06 μm, >98% T @ 1.54 and 3.4 μm). The resonator optics were a 4 m radius of curvature high reflector and a flat output coupler with 70% reflectivity @ 3.4 μm. The cavity mirrors had high transmission at the pump and 1.54 μm wavelengths. The lithium niobate crystal was A.R. coated with less than 1% reflectivity per surface for all three wavelength regions. However, the crystal exhibited 1–2%/cm absorption in the 3.4 μm region. This absorption has been noted previously and greatly reduces the OPO efficiency. It can limit the effective tuning range to wavelengths shorter than 3.7 μm when the idler wavelength is resonated.

The OPO was pumped with a 2.5 mm diameter beam with ≈30 mJ/pulse and a nominal 10 ns pulse width. With no etalon inserted, the OPO generated as much as 400 μj of 3.4 μm energy. The spectral width was ≈2 cm$^{-1}$. No significant change in the bandwidth was observed over the accessed tuning range, although significant changes in bandwidth have been observed in laboratory experiments when the pump beam angle, and thus the OPO wavelength, is tuned over a wider range. With a bare ZnSe etalon (FSR=3.5 cm$^{-1}$) inserted in the cavity between the rear mirror and the pump input coupler, no more than 200 μJ/pulse was typically generated. With the etalon, the line width was estimated to be ≈15 GHz, sufficiently narrow to pass through typical atmospheric transmission windows in this wavelength range.

Figure 9:
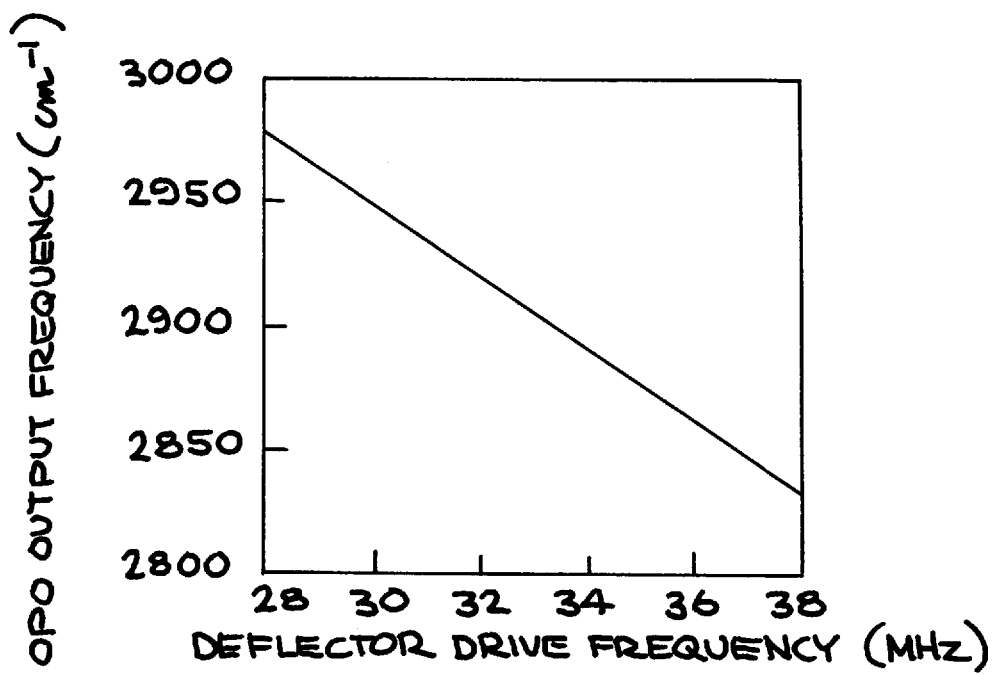
FIG. 9 shows the calibration curve of OPO output wavelength vs. modulator frequency.

The deflector was a commercial TeO$_2$ device providing a 93% deflection efficiency over a 10 MHz bandwidth. A 1:1 telescope was used to relay the deflected beam to the OPO. The OPO output wavelength was monitored with a 1 m grating spectrograph equipped with an InSb focal plane array camera. The spectrograph calibration was provided by an HCl gas cell which was back-lit with a blackbody source to provide a series of dark absorption lines on the camera image onto which the grating dispersed OPO output light could be superimposed. FIG. 9 shows the calibration curve of OPO output wavelength vs. modulator frequency. The measured tuning rate of 14.5 cm$^{-1}$/MHz is in good agreement with the frequency tuning rate of 9.3 cm$^{-1}$/mrad (external angle) calculated using plane wave phase matching equations and the 1.6 mrad/MHz deflection rate specified by the manufacturer for this deflector. Thus, this device has a ≈150 cm$^{-1}$ effective tuning range, primarily limited by the falloff of deflector efficiency.

The OPO was operated at repetition rates up to 500 Hz with both the AO deflector and a galvanometric mirror. However, while galvanometric mirrors with deflection rates much greater than 1 kHz are not available, the acousto-optic device should be useful at rates beyond 10 kHz, given its nominal 15 μs random access address time. The beam deflector is driven via a computer interface through which a pre-programmed set of deflector settings determined from the calibration curve, FIG. 9, is repeatedly cycled to give the desired wavelength set. (Other output formats, including random access tuning are also possible.) In principal the output is nearly continuously tunable, limited only by the deflector driver bit resolution. However, when an etalon is inserted, only the comb of frequencies corresponding to the etalon transmission spectrum is permitted. The beam deflection is chosen to center the free running gain bandwidth on the etalon passband. In practice we have found it necessary to use etalons whose FSRs exceed 3 cm$^{-1}$ to avoid generating unwanted light at the adjacent etalon orders.

Figure 10:
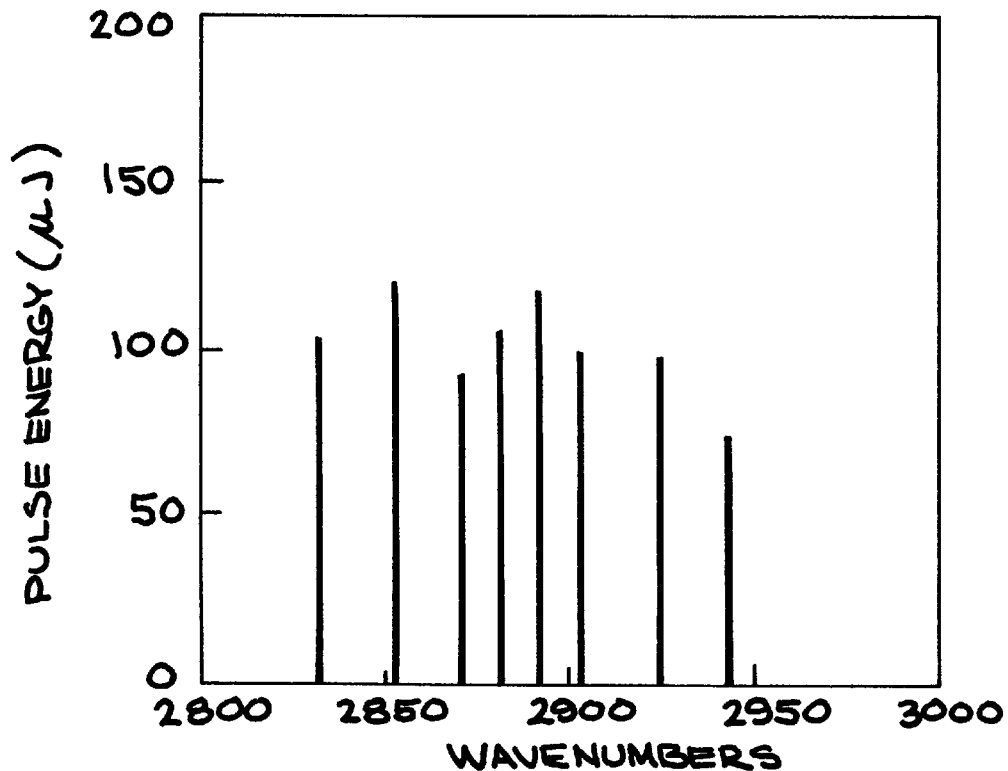
FIG. 10 shows a set of 8 colors generated at 500 Hz.

FIG. 10 shows a set of 8 colors generated at 500 Hz (effectively 62.5 Hz per 8 color cycle, 2 ms between color changes). The wavelengths are typical of those which were used to deconvolute hydrocarbon mixtures in our 7 km standoff field tests. The wavelengths chosen for transmission are a minimal subset of lines which minimize the concentration uncertainties, and have high transmission through the atmosphere. The optimization is constrained by the requirement that the frequencies be chosen from the etalon comb. The comb frequency offset is a degree of freedom which can be adjusted to the optimum value by tilting the etalon. The non-monotonic variations in average pulse energy from line to line are not well understood, but may be related to interference effects caused by filters and other optics between the OPO and the detector. In practice, the DIAL signals are normalized to the outgoing pulse energy and these variations have no significant effect on the measurement.

Figure 11:
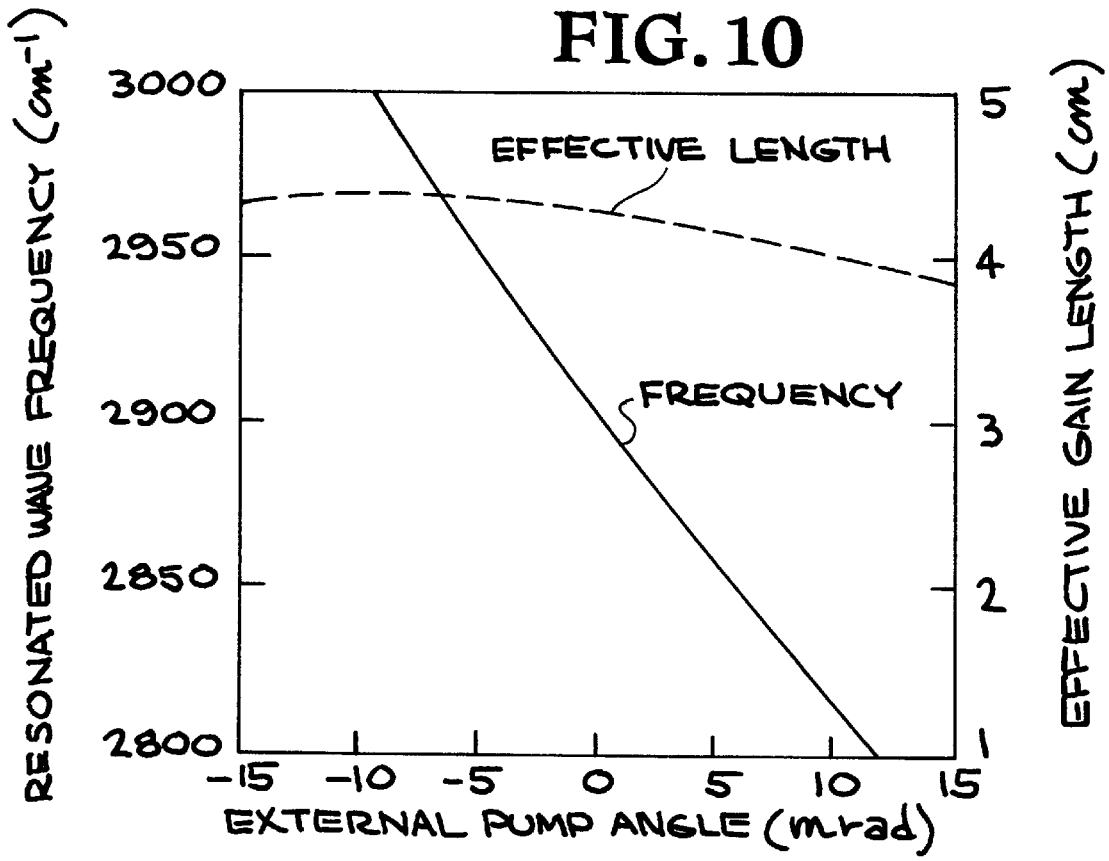
FIG. 11 shows the calculated $L_{eff}$.

It is interesting to consider the potential limitations on the pump angle tuning technique caused by changes in the overlap between the pump beam and resonated wave as the pump beam angle changes. Basu and Steier have considered the effect of noncollinearity on the effective gain length $L_{eff}$ of an OPO. The OPO threshold has been shown to depend inversely on the square of $L_{eff}$ by Brosnan and Byer. FIG. 11 shows the calculated $L_{eff}$ using parameters for the pump and resonated wave which closely match those of the device of the present invention. This calculation implies that a tuning range of 200 cm$^{-1}$, which essentially covers the entire hydrocarbon stretching region, can be accessed with less than a 10% change in the effective gain length.

Changes and modifications in the specifically described embodiments can be carried out without departing from the scope of the invention, which is intended to be limited by the scope of the appended claims.

The invention claimed is:

1. A rapidly tunable optical parametric oscillator (OPO), comprising:

means for generating a pump beam;

a beam deflector for changing the angle of said pump beam about a pivot point;

a nonlinear crystal;

a resonator cavity formed around said nonlinear crystal; and a relay telescope to relay the image of said pump beam at said pivot point to an image plane located within said nonlinear crystal.

2. The apparatus of claim 1, further comprising a beam reducing telescope to demagnify the pump deflection angle.

3. The apparatus of claim 1, further comprising an expanding telescope to magnify the pump deflection angle.

4. The apparatus of claim 1, wherein said resonator cavity comprises a configuration selected from a group consisting of a folded resonator and a ring resonator.

5. The apparatus of claim 1, wherein said resonator cavity comprises a stable resonator.

6. The apparatus of claim 1, wherein said resonator cavity comprises an unstable resonator.

7. The apparatus of claim 1, further comprising an etalon selected from a group consisting of a fixed etalon and a tunable etalon, wherein said etalon is inserted within said resonator cavity to narrow the linewidth of an output beam from said rapidly tunable optical parametric oscillator.

8. The apparatus of claim 1, further comprising a seed source for injection seeding said OPO, wherein said seed source is selected from a group consisting of a tunable seed source and a frequency multiplexed seed source.

9. The apparatus of claim 1, wherein said nonlinear crystal is selected from a group consisting of lithium niobate, AgGaS$_2$, AgGaSe$_2$, KTP, KTA, ZnGeP$_2$, CdSe, KDP, BBO, LBO and CLBO.

10. The apparatus of claim 1, wherein said means for generating a pump beam comprises a laser medium selected from a group consisting of Nd:YAG, Nd:YLF, Tm:YAG, Ho:YAG, Er:YAG and KrF.

11. The apparatus of claim 1, wherein said beam deflector comprises a single transducer TeO$_2$ modulator.

12. The apparatus of claim 1, wherein said beam deflector is selected from a group consisting of a galvanometric moving mirror, an acousto-optic beam deflector and an electro-optic beam deflector.

13. The apparatus of claim 1, wherein said beam deflector comprises a galvanometric mirror combined with an acousto-optic deflector, wherein said galvanometric mirror provides "coarse" angle changes at a reduced duty factor and said acousto-optic deflector provides "fine" angle tuning at the full repetition rate of said OPO.

14. A method for rapidly tuning an optical parametric oscillator (OPO), comprising:
  generating a pump beam;
  changing, with a beam deflector, the angle of said pump beam about a pivot point; and
  relaying, with a relay telescope, the image of said pump beam at said pivot point to an image plane located within a nonlinear crystal, wherein a resonator cavity is formed around said nonlinear crystal.

* * * * *